G. W. BENTON.
WASHING-MACHINE.

No. 191,916. Patented June 12, 1877.

Witnesses:
Frank Hirsch
John Preiss

Inventor:
G. W. Benton
by Michael J. Stark
his Attorney.

UNITED STATES PATENT OFFICE.

GEORGE W. BENTON, OF CANASERAGA, NEW YORK, ASSIGNOR OF ONE-HALF HIS RIGHT TO JONATHAN GARWOOD, OF SAME PLACE.

IMPROVEMENT IN WASHING-MACHINES.

Specification forming part of Letters Patent No. 191,916, dated June 12, 1877; application filed February 26, 1877.

*To all whom it may concern:*

Be it known that I, GEORGE W. BENTON, of Canaseraga, in the county of Allegany and State of New York, have invented certain new and useful Improvements on a Washing-Machine; and I do hereby declare that the following description of my said invention, taken in connection with the accompanying sheet of drawings, forms a full, clear, and exact specification, which will enable others skilled in the art to which it appertains to make and use the same.

My invention relates to that class of washing-machines in which a yielding rubbing-cylinder is employed to clean the clothes, in conjunction with a yielding or receding concave rubbing-bed; and it consists in the arrangement of parts and details of construction as hereinafter first fully described and then pointed out in the claims, whereby the construction of such a machine is considerably simplified, and the same rendered more durable, and therefore more salable and desirable.

Figure 1:
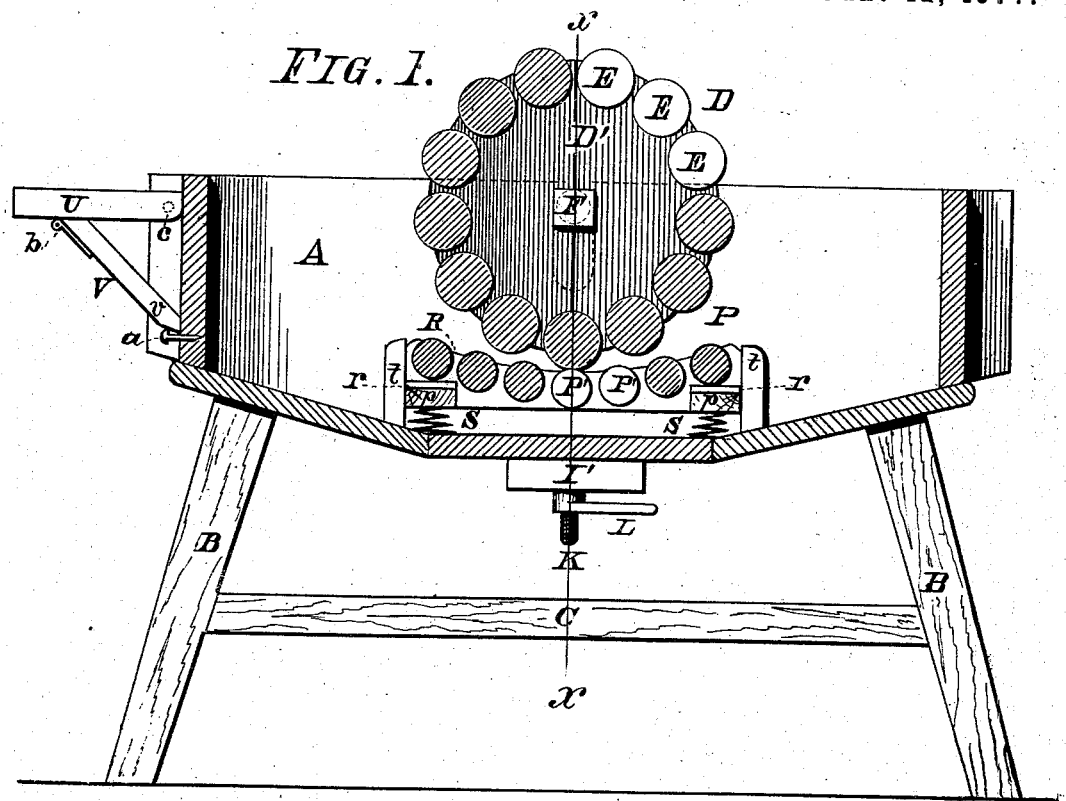
Figure 2:
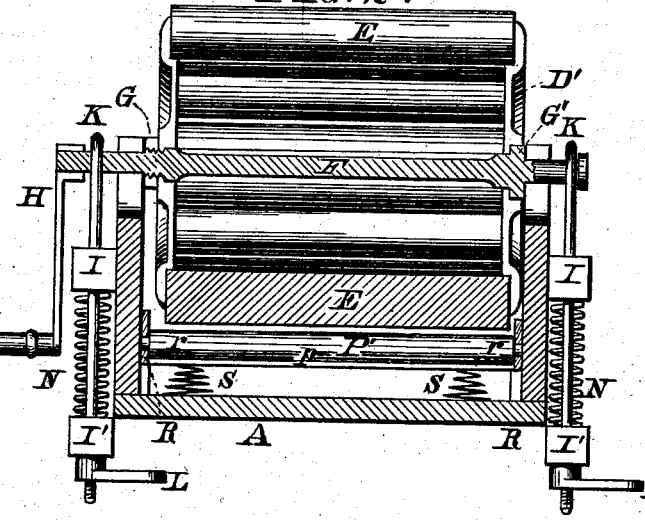

In the drawings hereinbefore mentioned, Figure 1 is a sectional elevation of my improved washing-machine, and Fig. 2 a fractional transverse section in line $x\ x$ of Fig. 1.

Like parts are designated by corresponding letters of reference in both figures.

A is the wash-tub, consisting of a rectangular receptacle having its bottom partly inclined, and being supported by the legs B, braced for strength by the longitudinal pieces C. Within this tub is placed a rubbing-cylinder, D, consisting of the two heads or disks, D', and the series of solid cylindrical rods E, said heads being placed upon an angular shaft, F, and retained in proper position by the shoulder or collar G' near one end, and the tightening-nut G on the other end, the solid cylindrical rods E being interposed between the two disks D', thereby insuring their moving together. These disks I now make, preferably, of galvanized cast-iron, and in order to retain the rods in proper position to prevent them from falling out without resorting to nails, screws, and similar contrivances in each rod, I provide the said disks with a number of recesses corresponding to that of the rods employed, said recesses or depressions being more than a semicircular section of a circle whose diameter corresponds to that of said rods, so that when these are placed in said depressions they cannot escape, notwithstanding the fact that part of their circumference projects over the edge of said disks.

By this arrangement, which is clearly shown in Figs. 1 and 2 of the drawings, I am enabled to use solid cylinders for said rods, which, being made by a rod-machine, can be very cheaply produced, while, by their peculiar mode of attachment by the nut G, in conjunction with said disks D', I am enabled at any time to readily remove any one or more of the rods E, should they require removing, &c., by simply turning said nut G and lifting one of the heads. The solid cylindrical rods are placed in the disks in such manner that a space intervenes between them. This I have thus arranged to readily drain the interior of the cylinder D after washing is done. In nearly all cylinders having curved or triangular rods, these are placed close together, so that water gradually accumulating in the interior cannot escape after washing is done, on account of the swelling of the wood and the rods making tight joints, which water, being retained in the cylinder, will rot the wood in a very short time. This obstacle I have overcome in my device, which will drain itself instantaneously, and allow air to surround the rods from all sides, whereby they are preserved, and will last a very long time.

As heretofore described, the solid rods E project over the disks for a part of their diameter less than their radius. This will allow the rods to be made nearly as long as the width of the tub A, and presents a larger or longer rubbing-surface than could otherwise be obtained, while their projecting part allows the cylinder to come in close contact with the lower rubber, which could not be obtained were the disks even with, or projecting over, the said rods.

The shaft F is turned by the crank H, and it revolves in U-shaped excisions in the longitudinal sides of the receptacle A. This shaft is rendered yielding by means of the screw-rods K passing through the guide-blocks I and followers I', and having a handle-nut, L, engaging with the threads on the lower end of said rods K, in conjunction with spiral springs N interposed between the said guide and follower blocks, of which the former is rigidly secured to the sides of the receptacle A, and the latter movable and under the influence of, and controlled by, the said springs N and the handle-nuts L, respectively. The rods K are provided with hooks on their upper ends, engaging with the shaft F. Thus, by screwing up the nuts L the springs N are tensioned, and can be set to press the upper cylinder D upon the lower rollers with any desired force. These rollers P P' are placed into a concave bed consisting of the cast-iron galvanized sides R, provided with holes for the reception of the roller-pivots, and with lugs r, to which are attached the transverse pieces p, guides t being attached to the side walls of the receptacle A to keep the said concave bed in proper position. This concave bed rests upon conical volute springs S, secured to the transverse pieces p, so that it can yield, together with the upper cylinder, to accommodate the varying thicknesses of cloth passing between them during the washing process. These springs S are conical volute springs, to allow their depression to the smallest possible compass, the space between the transverse pieces p and the bottom of the tub A being so limited as to preclude the possibility of successfully using cylindrical or parallel coiled springs.

Attached to the head or end of the machine is a table, U, having pivots c engaging with proper apertures in the sides of the box A, and the support V, hinged to it at b, a pin, a, being inserted into the said end board at proper place, to support the said brace V. This table is a very useful appendage to a washing-machine, for placing the soap and other articles thereupon, and for other purposes readily perceived by those using said machine. This table, if in the way when storing the machine, can be lowered down by raising the brace V from its support a, and allowing the same to drop down.

By the introduction of the several improvements, as hereinbefore mentioned, I have succeeded in rendering my machine more durable, less costly, and therefore more desirable.

Having thus fully described my invention, I desire to secure to me by Letters Patent of the United States—

1. In washing-machines, a revolving cylinder composed of a series of solid round rods placed between metal disks having depressions of more than a half-circle and less than a whole, so that part of said rods project over the periphery of said disks, said rods having a space between them, to allow ready draining of the cylinder, and being clamped between the disks by a collar on one end and a nut on the other end of an angular shaft, and prevented from moving out of said recesses by their walls embracing more than one-half of the circular circumference of said rods, substantially as hereinbefore set forth and described, for the purpose stated.

2. The hereinbefore-described washing-machine, consisting of a rectangular tub, A, revolving cylinder D, composed of disks D' having circular depressions to retain solid cylindrical rods E, as described, concave rubbing-bed P, guides t, conical volute springs S, and the tensioning device consisting of the rods K, guide-blocks I fastened to the tub A, followers I', springs N, and handle-nuts L, the whole constructed and arranged substantially as described.

In testimony that I claim the foregoing as my invention I have hereto set my hand and affixed my seal in the presence of two subscribing witnesses.

GEO. W. BENTON. [L. S.]

Witnesses:
MICHAEL J. STARK,
FRANK HIRSCH.